United States Patent [19]

Newton

[11] Patent Number: 4,687,225
[45] Date of Patent: Aug. 18, 1987

[54] VEHICLE STABILIZER

[76] Inventor: Alan R. Newton, 67 Bluebird Ave., E. Wareham, Mass. 02571

[21] Appl. No.: 844,080

[22] Filed: Mar. 26, 1986

Related U.S. Application Data

[63] Continuation of Ser. No. 728,585, Apr. 29, 1985, abandoned, which is a continuation of Ser. No. 340,308, Jan. 18, 1982, Pat. No. 4,530,518.

[51] Int. Cl.$^4$ ............................................. B62D 37/04
[52] U.S. Cl. ..................................... 280/758; 188/378
[58] Field of Search ...................... 280/755, 757, 758; 267/66, 67, 68; 188/311, 312, 313, 316, 317, 321.11, 297, 378, 379, 380

[56] References Cited

U.S. PATENT DOCUMENTS

| | | | |
|---|---|---|---|
| 1,783,348 | 12/1930 | Taylor | 280/758 |
| 2,633,368 | 3/1953 | Ross | 280/758 |
| 2,635,898 | 4/1953 | Silverman | 280/758 |
| 2,703,718 | 3/1955 | Hutchinson | 280/758 |
| 3,596,924 | 8/1971 | Watts | 280/758 |

Primary Examiner—John J. Love
Assistant Examiner—Michael Mar
Attorney, Agent, or Firm—Wolf, Greenfield & Sacks

[57] ABSTRACT

A device preferably mounted to the rear section of a vehicle such as from the vehicle rear axle for stabilizing the vehicle in turns and skids and providing improved overall holding power of the vehicle to the roadway. The stabilizer operates on a hydraulic principle and comprises a housing that may be partially liquid filled such as with a hydraulic oil, although the stabilizer also is operative with the use of solely an air fill. A substantial weight mass is disposed in the housing and is responsive to centrifugal force such as occasioned by a vehicle turn, particularly an abrupt turn, to cause displacement thereof axially of the housing. The device further comprises a piston at each end of the housing and a spring associated therewith for biasing the piston to a normal rest position. The piston has an aperture to permit fluid bleeding between opposite sides thereof to enhance stabilizer action.

5 Claims, 26 Drawing Figures

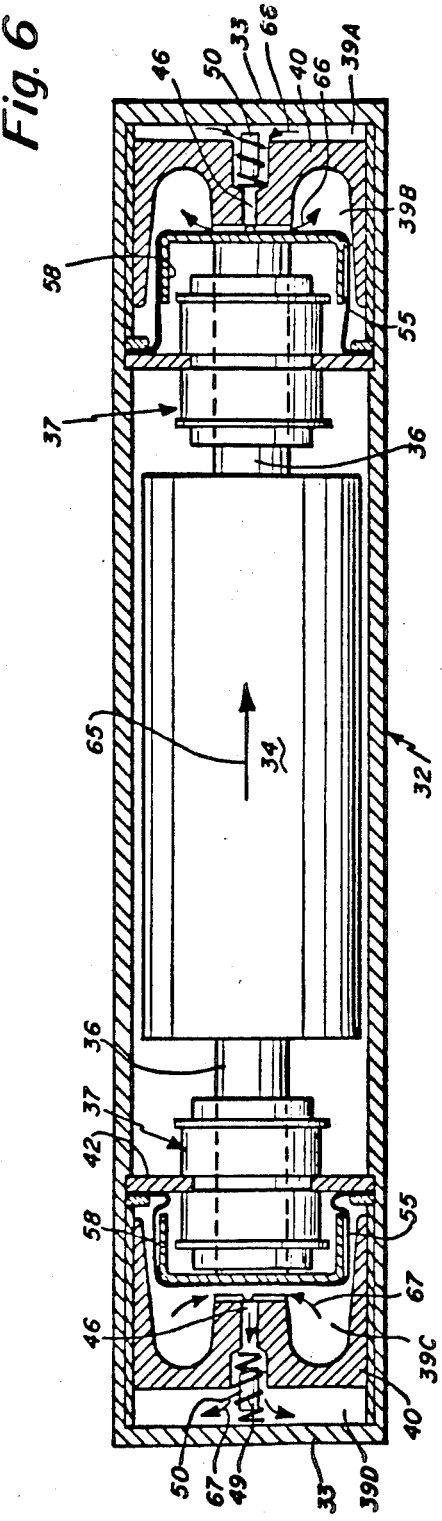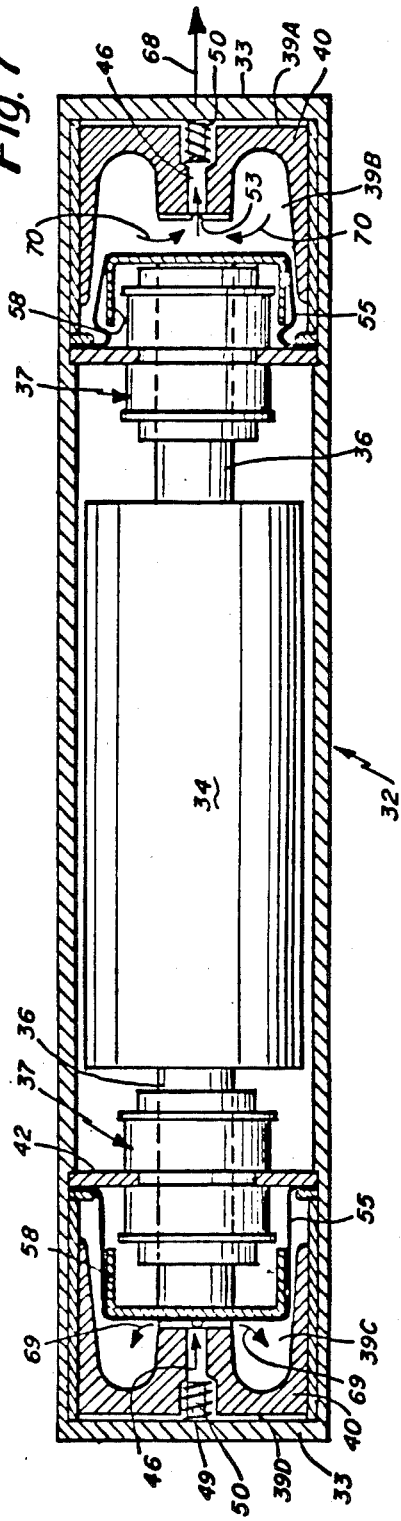

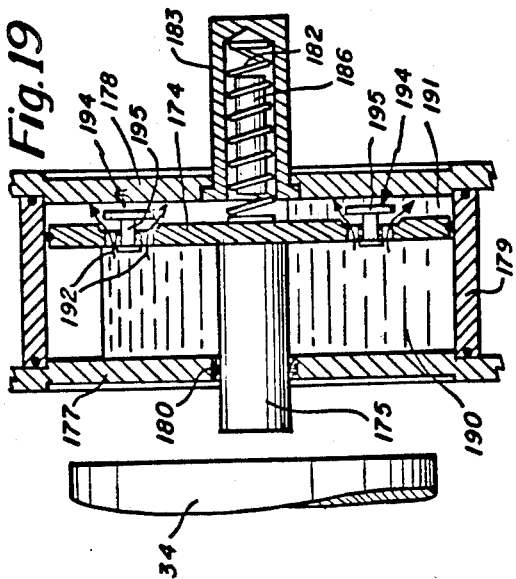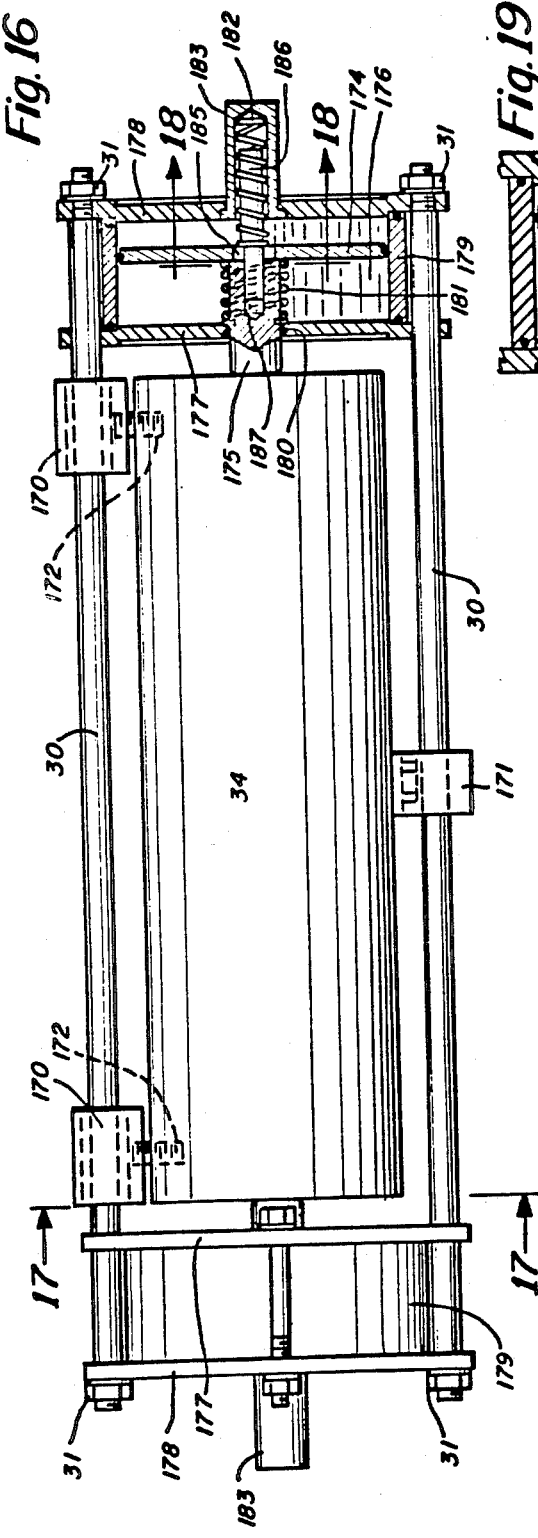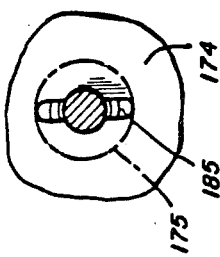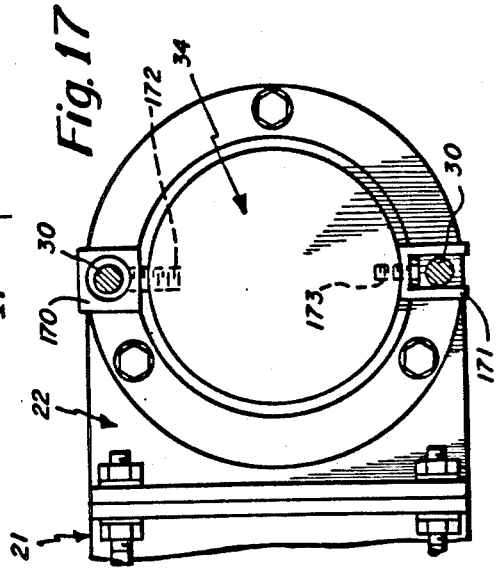

VEHICLE STABILIZER

This application is a continuation of application Ser. No. 06/728,585, filed 4-29-85, now abandoned, which is a continuation application of Ser. No. 06/340,308 filed Jan. 18, 1982, now U.S. Pat. No. 4,530,518.

BACKGROUND OF THE INVENTION

The present invention relates to a vehicle stabilizer for balancing a vehicle in motion particularly under conditions of turning or skidding. The principles of this invention may be applied to automobiles, trucks; or other moving objects.

Various constructions of stabilizers are shown in prior art patents such as U.S. Pat. Nos. 2,635,898 to Silverman, or 3,596,924 to Watts. Although these structures are operative to some extent, they do not provide sufficient stabilization, particularly for the smaller lightweight vehicles that are presently coming into use more and more from year to year.

Accordingly, it is an object of the present invention to provide an improved vehicle stabilizer which operates automatically to provide stabilization in a vehicle turning and also to resist vehicle skidding.

Another object of the present invention is to provide an improved vehicle stabilizer which efficiently and effectively and in an automatic manner substantially reduces, if not entirely eliminating, the common "fishtailing" effect experienced in driving vehicles particularly in poor weather conditions and particularly characteristic of the presently used light-weight vehicles.

Still another object of the present invention is to provide an improved vehicle stabilizer which, by virtue of stabilizing the driving of the vehicle is instrumental in preventing accidents and preventing the overturning of the vehicle particularly when taking curves and/or when driving in poor weather.

A further object of the present invention is to provide a vehicle stabilizer readily mountable adjacent the rear section of the vehicle and having an actuator means therein movable axially in response to sudden movement of the vehicle to enhance the traction of the rear wheels and prevent undesirable vehicle skidding and which is further characterized by an improved bleeding action to provide for smooth stabilization.

Another object of the present invention is to provide a vehicle stabilizer which operates automatically, which is simple to install in the vehicle, which is relatively inexpensive to manufacture, which is reliable in operation and which requires little or no maintenance.

SUMMARY OF THE INVENTION

To accomplish the foregoing and other objects of this invention there is provided a vehicle stabilizer which is preferably adapted to be mounted to the rear of a vehicle such as from the rear axle disposed substantially horizontal such as behind the differential housing which is in the middle of the rear axle housing. The vehicle stabilizer comprises a frame means that may or may not be in the form of an enclosed housing and which has clamping means for securing the stabilizer to the vehicle preferably in the aforementioned position. A relatively heavy mass such as one on the order of about 25 pounds is disposed in the frame means. Means are provided for supporting the mass for axial, bidirectional translation in the frame means between opposite ends of the frame means. The frame means has means defining a compression chamber at each end of the frame means. A pair of pistons are used, one associated with each compression chamber. Means are provided for supporting each piston for sliding motion in response to mass translation in a first direction to cause compression of fluid in the compression chamber. Also, means are provided for enabling recharging of the compression chamber in response to mass translation in a second direction opposite to the first direction. The concepts of this invention of compression and relatively rapid recharging provide for a dampening effect not found in previous constructions of the general type.

In accordance with one aspect of the present invention there is also provided a piston return spring disposed in the compression chamber between the piston and frame means. There may be provided a volume displacement pin captured by the piston return spring and usable for controlling the recharging and/or compression. The piston may have a through passage for fluid communication between opposite sides of the piston. This passage may have a shoulder for receiving one end of the return spring. In some embodiments described herein there is also provided a diaphragm and means for arranging the diaphragm between the piston and the mass. The aforementioned passage in the piston is adapted to be blocked by the mass in the equilibrium position of the mass.

In accordance with another aspect of the present invention the mass has end shafts or rods, one at each end thereof and the frame is provided with bearing means for supporting these shafts or rods. There may also be associated with the piston, a piston driver extending between the mass and the piston and the piston may have a tail piece coupled therefrom and slideably engaged in the piston driver. There is also described herein in one version a compression relief hole in the piston driver. This version may also include a diaphragm between the mass and the piston driver.

In accordance with another aspect of the present invention, there is described herein the use of a hydraulic oil disposed in the housing means. However, such liquid is not necessary in connection with the compression/recharging concept of this invention. Oil is used herein as a lubricant for the bearing and piston and also as a volume displacement element to prevent or minimize air pocketing in the spring chamber. However, this liquid may not necessarily be the prime damper but instead the air that is in the compression chamber functions as the prime damper. The present invention is intended to cover arrangements using air and/or fluids.

In accordance with another aspect of the present invention the piston is defined as comprising a disc piston having a centrally disposed hole and with a tail piece extending axially therefrom. The mass may have a passage for receiving the tail piece and the tail piece may in turn have an axial passage. The mass may have a supported shaft with a breather port communicating with the tail piece passage. A piston return spring extends through the piston hole and engages in the tail piece passage.

In accordance with still another aspect of the present invention the means for supporting the mass may include means mounted to the frame means outside of the mass including rail means for supporting and guiding the mass linear translation.

In accordance with a further aspect of the present invention the piston may be provided with valve means therein adapted for opening to cause compression chamber recharging. This valve means may be in the form of a one way plunger structure.

In accordance with another aspect of the present invention the mass has a reduced diameter end forming the piston and said means for supporting the piston comprises cylinder means at least in part forming the compression chamber. The cylinder means is preferably constructed and arranged for sliding movement so that the cylinder can move with the piston under suction which occurs in the compression chamber during recharging. In this regard the cylinder preferably has venting port means and means for blocking the port means during compression action occassioned by said mass.

In accordance with still another aspect of the present invention the means for supporting the mass may comprise roller means.

In accordance with still another aspect of the present invention the mass may have a recess forming a cylinder for receiving and supporting the piston. In this arrangement spring means may be provided in the cylinder between the piston and the mass. There may also be provided a bumper disposed between the piston and frame means.

In accordance with another feature of the present invention the vehicle stabilizer comprises frame means adapted to be secured to the vehicle preferably in the same manner mentioned previously associated with the rear axle housing of the vehicle. A mass is disposed in the frame means and the mass has means defining a pressurized end. This pressurizing end may be considered as in the form of a piston itself. Means are providing for supporting the mass end or piston and defining with the end a compression chamber adapted to close as the mass moves into the supporting means. Means are provided enabling recharging of the compression chamber to cause opening thereof in response to mass translation out of the supporting means. The supporting means may comprise an open cylinder having porting means. Means are also provided for blocking the porting means particularly operable during the compression phase of operation. This end of the mass may be a reduced diameter section of the mass.

BRIEF DESCRIPTION OF THE DRAWINGS

Numerous other objects, features and advantages of the invention should now become apparent upon a reading of the following detailed description taken in conjunction with the accompanying drawings in which:

FIG. 6 is a cross sectional view of the embodiment of FIG. 3 showing the stabilizer operation with the vehicle in a turning mode;

FIG. 7 is also a cross sectional view of the embodiment of FIG. 3 with the stabilizer illustrated in a skid position;

FIG. 16 is a longitudinal cross sectional view of an eighth embodiment of the present invention;

FIG. 17 is a cross sectional view taken along line 17—17 of FIG. 16;

FIG. 18 is a small cross sectional view taken along line 18—18 of FIG. 16;

FIG. 19 is a fragmentary cross sectional view at a side elevation showing a nineth embodiment of the present invention similar to the embodiment of FIG. 16;

DETAILED DESCRIPTION

FIGS. 1-7 illustrate a first embodiment of the present invention showing a preferred means of attaching the automobile stabilizer to the rear of the vehicle. FIGS. 8-26 illustrate a number of other embodiments of the present invention. Many of these embodiments are illustrated in fragmentary views, being understood that the two ends of the stabilizer may be constructed identically. Furthermore, the stabilizer in these alternate embodiments may be supported in a manner similar to the support illustrated in the embodiment of FIGS. 1-7.

Figure 1:
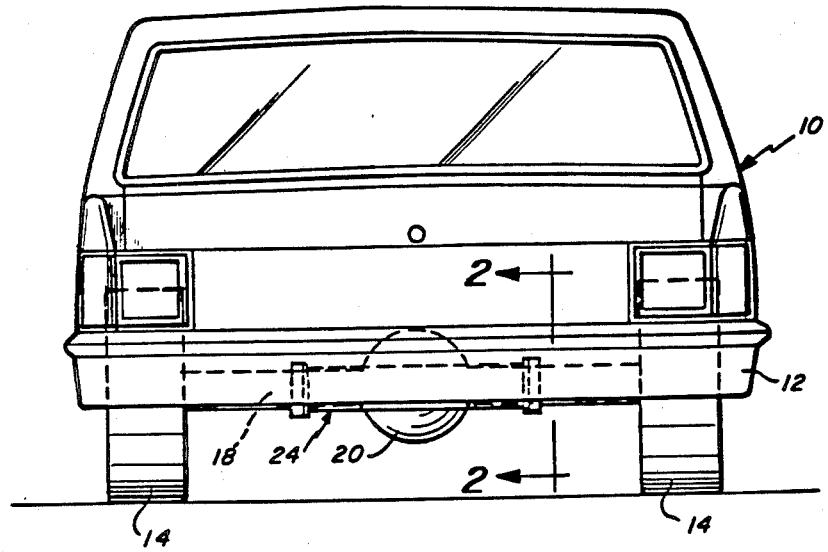
FIG. 1 is a rear view of a vehicle having the stabilizer of this invention secured to the rear axle thereof.
Figure 2:
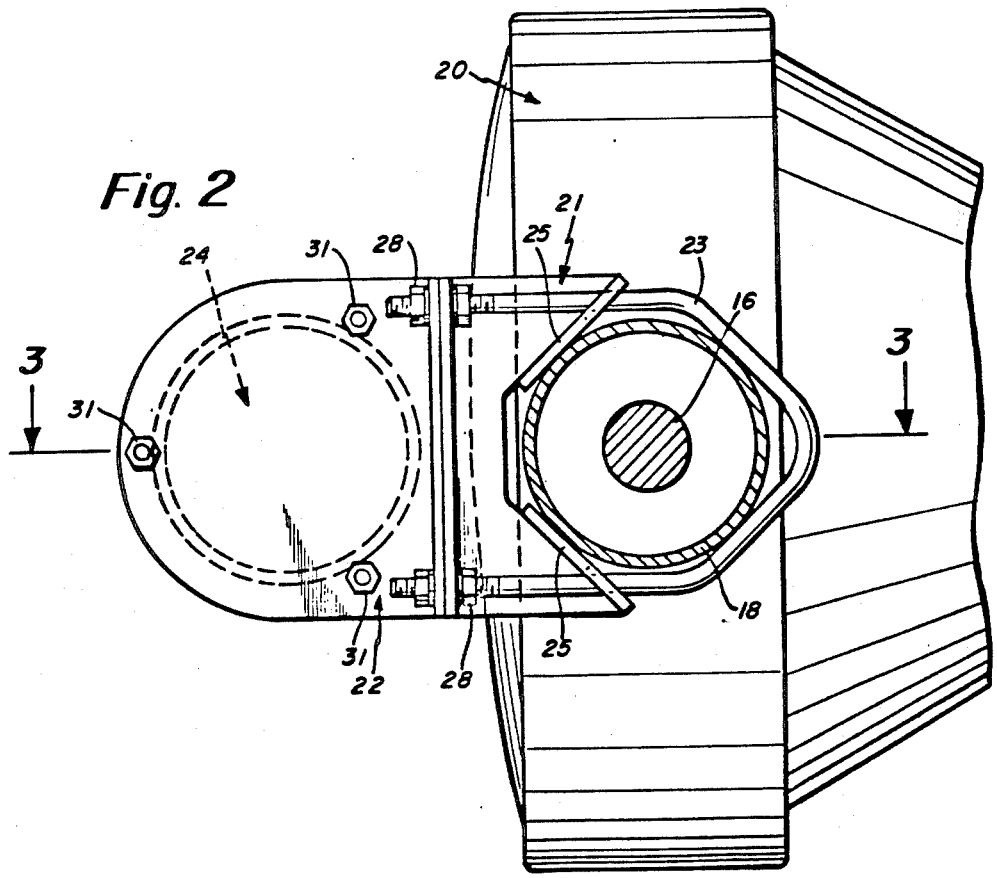
FIG. 2 is a cross sectional view taken along line 2—2 of FIG. 1 showing an end view of the stabilizer of FIG. 1.
Figure 3:
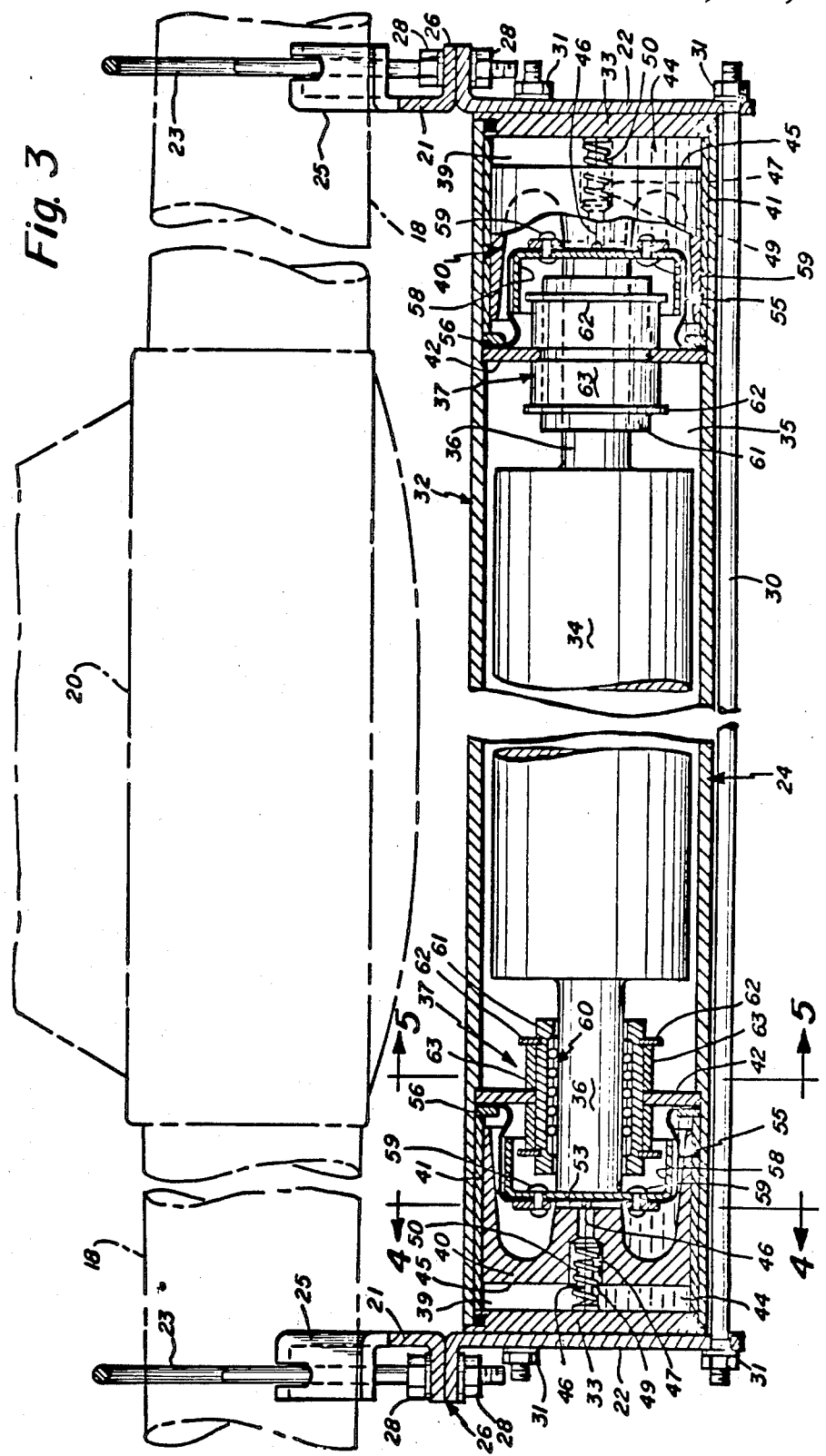
FIG. 3 is a cross sectional view taken along line 3—3 of FIG. 2 showing the details of a first disclosed embodiment of the present invention with the mass in its rest or equilibrium position.

In the first embodiment of FIGS. 1-7, there is shown a vehicle 10 particularly illustrated from the rear including a rear bumper 12, rear wheels 14, and a rear axle 16 and associated axle housing 18. As illustrated in FIG. 2, the axle housing 18 extends from a rear differential housing 20. The vehicle stabilizer 24 is secured to the axle housing 18 as illustrated in FIGS. 2 and 3 by means of a pair of U bolts 23 which extend about at least half of the housing 18. The bolts 23 are disposed as indicated in FIG. 3 associated with the oppositely disposed axle housings 18 spaced preferably equally from the central differential housing 20. The bolts 23 are secured to like respective brackets 21 and 22. Because these brackets are identical, only one set of the brackets is discussed in detail, the other set being constructed and supported the same. The bracket 21 has flanges 25 which are disposed at about 90° to each other as illustrated in FIG. 2. The brackets 21 and 22 have legs joined at 26 and secured by means of the nuts 28 secured to threaded ends of the U bolt 23.

Threaded rods 30, of which there are preferably three, extend between the brackets 22 and are secured to the brackets with the stabilizer disposed therebetween by means of a series of securing nuts 31.

The vehicle stabilizer 24 in addition to its mounting structure, comprises a housing 32 including end plates 33. A mass 34 of relatively substantial weight is disposed in a centrally defined chamber 35 of the housing. The mass 34 has extending from opposite ends thereof rods 36. The rods support the mass 34 in respective bearing supports 37.

Because the structure shown is substantially identical in construction between the two ends, the construction of one end will suffice, it being understood that the construction of the opposite end is substantially identical. Thus, in addition to the centrally disposed compartment 35 for accommodating the mass 34, there is also provided separate end compartments or cylinders 39 having disposed therein the piston 40. The piston 40 is disposed within an internal sleeve 41 fixedly positioned in the compartment 39. The compartments 35 and 39 are separated by means of a support wall or ring 42 from which is supported the bearing support 37. FIG. 3 shows a hydraulic oil 44 disposed in the compartment 39 preferably to a level 46. The oil 44 is used primarily for lubrication for the bearing and piston also for a volume displacing element to prevent or minimize air pocketing in the chamber 39. However, the oil 44 is not considered to be the prime damper but instead the air within the compartments is so considered. The compressing of the air is a means of multiplying the density within the chambers.

Figure 4:
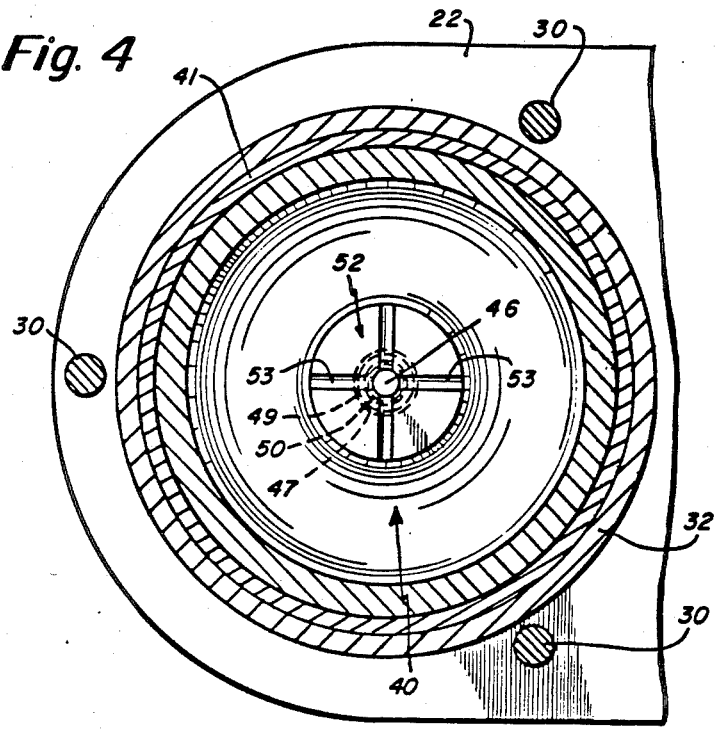
FIG. 4 is a cross sectional view taken along line 4—4 of FIG. 3 showing further details of the piston.

The piston 40 has a flat face 45 and has a centrally disposed passage 48 having an enlarged diameter section 47 forming a seat for receiving one end of the spring 49. The spring 49 is for positioning the piston 40 in a state of equilibrium as shown in FIG. 3. The spring 49 surrounds a volume displacing pin 50. The piston 40 also has an opposite face 52, such as illustrated in FIG. 4, having radially disposed notches 53. The notches 53 are for dampening bleedout as discussed in more detail hereinafter with regard to the views of FIGS. 6 and 7 schematically illustrating certain forms of operation of the stabilizer.

In the first embodiment now being described, the oil 44 is maintained within the compartment 39, and adjacent to the piston there is provided a diaphragm 55 anchored at its periphery between ring 42 and ring 56. The diaphragm 55 is also secured to the cup shaped member 58 which in turn is secured to the end of the rod 36 associated with the mass 34. FIG. 3 illustrates securing bolts 51. Rivets 59 are shown for securing the diaphragm to the cup shaped member.

Figure 5:
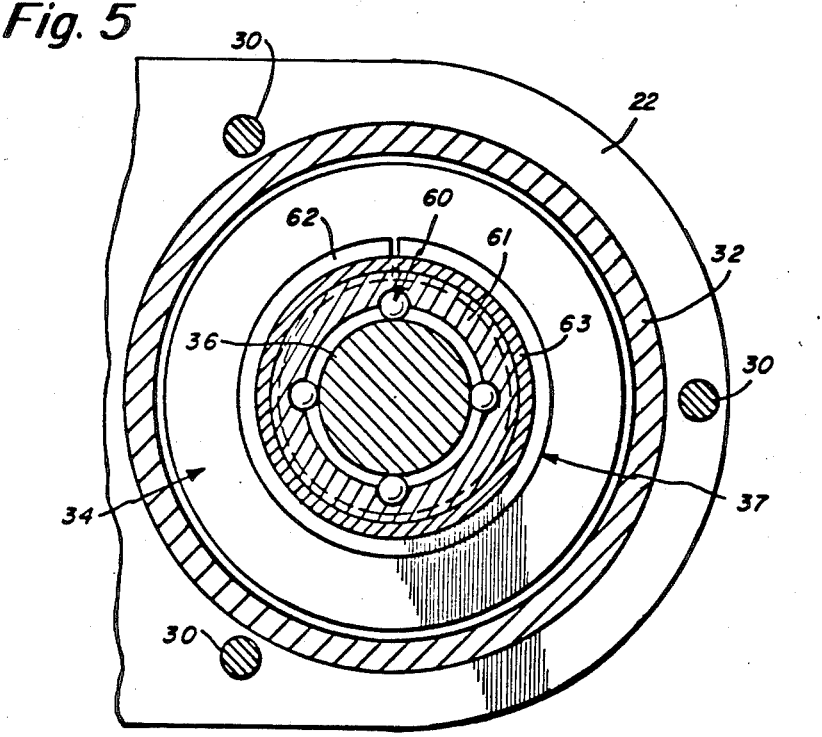
FIG. 5 is a cross sectional view taken along line 5—5 of FIG. 3 showing further details of the mass mounting arrangement.

The bearing support 37 comprises a bearing 60 which may be a ball bearing as shown supported within bearing housing 61. The housing 61 is maintained in position by means of a pair of snap rings 62 and associated spacers 63 (FIG. 5).

As mentioned previously, in the position of FIG. 3, the stabilizer is in its equilibrium position. This is the position assumed by the stabilizer when the vehicle is, of course, stationary or moving in a substantially linear driving path. In this position the springs 49 at opposite ends of the stabilizer centralize the mass 34. It is noted in this position that the faces 52 of the oppositely disposed pistons are substantially in contact with the diaphragm 55 and associated ends of the mass 34 (FIG. 4).

FIG. 6 illustrates the stabilizer when the vehicle is making a turn. In FIG. 6 the arrow 65 illustrates the direction of shifting of the mass 34 due to the vehicle making a turn. This action forces the piston 40 at the right hand side in FIG. 6 toward the end wall 33. This causes a compression of the associated coil spring 49. The fluid within area 39A is caused to bleed relatively slowing through the passage 46 and out the notches 53 to the compartment 39B shown in FIG. 6. The arrows 66 illustrate the direction of flow of the fluid. At the same time at the left end of the stabilizer the central port 48 in the piston 40 is essentially fully open, not being covered by the diaphragm 55 and as indicated by the arrows 67 the fluid flows from the chamber 39C to the chamber 39D. This causes the relaxation of the spring 49. This also causes a sucking-in and filling or charging of the chamber 39D. This controlled bleeding of the fluid between opposite sides of each of the pistons causes a more gradual and smooth transition of the mass thus providing improved stabilization. Thus, in FIG. 6 as the left hand chamber 39D is charged the right hand chamber 39A is essentially discharging the fluid. This provides a significant improvement in the damping action of the mass.

FIG. 7 is depicted to illustrate the operation in a skid. In FIG. 7 the arrow 68 illustrates the direction of skid. For this skid action the housing 32, along with the vehicle, shifts; forcing the piston 40 at the left end of the stabilizer in FIG. 7 into contact with the mass. The fluid passes in the direction of arrows 69 from the chamber 39D to the chamber 39C. This provides a damping action while rapidly accelerating the mass at less than the skid velocity and in a short distance. The arrows 70 in FIG. 7 show the direction of fluid flow at the right end of the stabilizer.

In the number of alternate embodiments of the invention described hereinafter, like references characters are employed to identify parts of the stabilizer similar to the parts identified in the first embodiment of FIGS. 1–7. Thus, for example, in the embodiment of FIGS. 8 and 9, there are provided a pair of brackets 22 for supporting the stabilizer. The stabilizer comprises a housing 32 and end walls 33. In this embodiment, rather than employing the support rods 30 of the first embodiment, there are provided securing bolts 72. The end walls 33 are made sufficiently thick to receive the bolts 72. Disposed within the central compartment or chamber 35 of the housing is the mass 34. Disposed at opposite ends of the mass are float pins 73 supported commonly with the nut 74 and diaphragm 75. Within the chamber 76 there is also provided the shock plate 77 having a bearing 78 associated therewith. The shock plate 77 has passage holes 79 as noted. There is also provided a diaphragm ring 80 which is used in supporting the diaphragm 75. Also provided is an internal cylinder 81 defining a chamber for the piston 82. Piston 82 preferably has associated therewith a sealing O-ring 84. The piston 82 also has holes 85 therethrough. These are refill holes through which fluid communicates in the recharging action previously discussed with regard to FIG. 6 and the left hand side of that diagram. The end plate 33 is provided with a central aperture for receiving the filler plug 87. Between the filler plug 87 and the piston 82 there is provided a biasing spring 88 and associated volume displacer 89. The piston 82 also has associated therewith a shank 90 which permits some sliding motion during recharging between the piston 82 and the member 91. The member 91 is also provided with a relief hole 92 which is a breather hole for use during compression and communicating with the chamber 93 on the other side of the piston 82.

Figure 8:
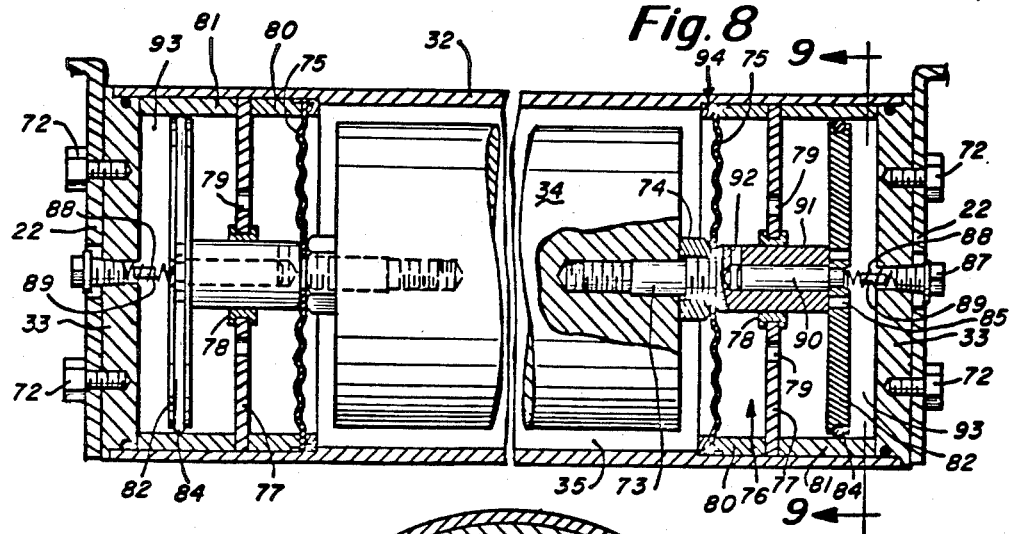
FIG. 8 is a cross sectional view of a second disclosed embodiment of the present invention and one which may be mounted in a similar manner to the mounting illustrated in FIGS. 1-3.
Figure 9:
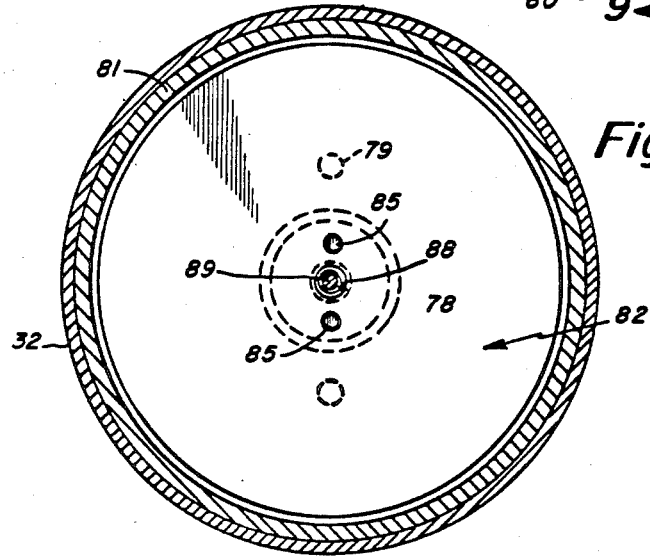
FIG. 9 is a cross sectional view taken along line 9—9 of FIG. 8 showing further details of this second embodiment.

The embodiment shown in FIGS. 8 and 9 operates similar to the previous embodiment depicted in FIGS. 1-7. As the mass 34 moves, for example, toward the right in FIG. 8, the piston is displaced to the right by action of the diaphragm and the member 91. The fluid in the chamber 93 is permitted to bleed off through a passage not totally shown in FIG. 8 but including the relief hole 92. Action at the opposite end of the stabilizer permits separation between the piston 82 and the member 91 to provide recharging fluid flow by means of the holes or ports 85. A seal is also preferably provided at 94 for providing a tight seal particularly when using a hydraulic fluid so that the central chamber 35 does not become filled which would hamper the free floating effect of the mass 34 therein. The shock plate 77 and its associated bearing 78 defines a shock support bearing. When the vehicle shocks the mass into radial compression of the diaphragm this bearing support prevents permanent distortion of the diaphragm by limiting the radial distortion.

Figure 10:
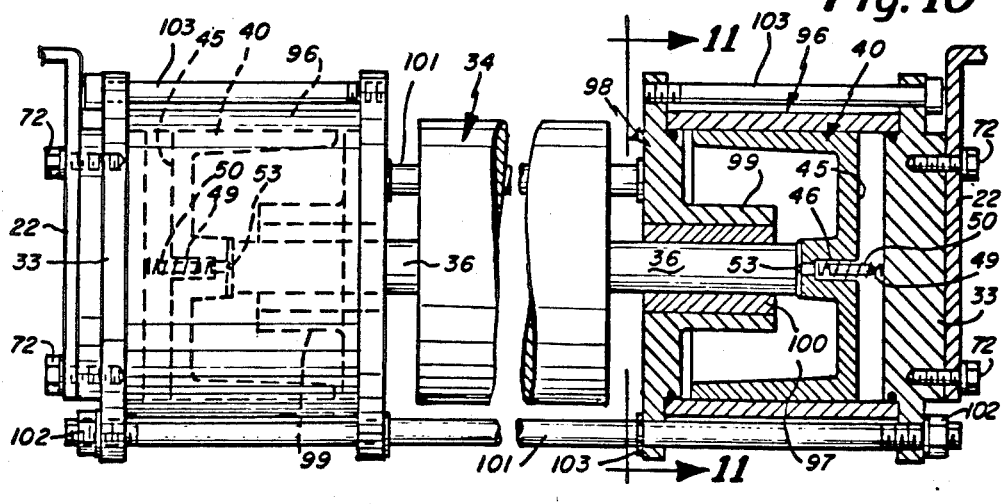
FIG. 10 is a third embodiment of the present invention in a longitudinal cross sectional view.
Figure 11:
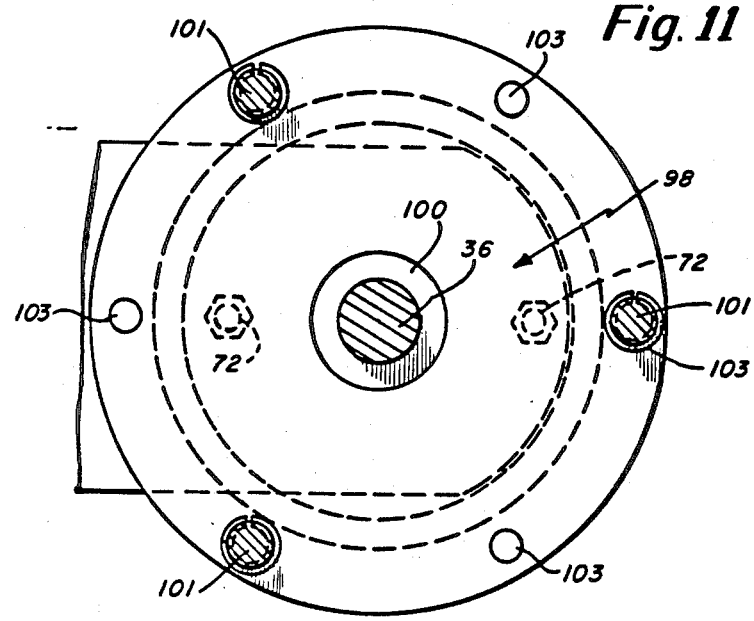
FIG. 11 is a cross sectional view of this third embodiment as taken along line 11—11 of FIG. 10.

FIGS. 10 and 11 show a third embodiment of the present invention. In this embodiment again, like reference characters are employed to identify similar parts to those previously referred to in connection with the description of the first embodiment of FIGS. 1-7. The embodiment shown in FIGS. 10 and 11 has the mass 34 with its end rods 36 disposed externally outside of any housing such as the housing 32 illustrated in FIG. 3. Instead, there are separate end housings which are identical forming separate piston compartments. FIG. 10 shows the two pistons 40 each in their respective cylinders 96. The piston compartment 97 in addition to being defined by the cylinder 96 is also formed by the end wall 33 and the mass supporting member 98. Member 98 has a centrally disposed collar 99 for supporting therein a bushing 100 which may be a standard bronze bushing or a ball bushing. The rods 36 extending from opposite ends of the mass 34 are supported in this bushing 100.

The separate end housings are secured together by means of three elongated rods 101 each having end nuts 102 associated therewith. There are also provided three bolts 103 which extend between the member 98 and the end wall 33 as noted in FIG. 10. Associated with the elongated rods 101 are locking rings 103, so as to properly position the members 98 relative to the rest of the structure.

The piston 40 has a flat face 45 as in the embodiment of FIG. 3 and has a through passage 46 for communicating between opposite sides of the piston. The larger diameter section 47 of the passage supports one end of the spring 49 with the other end of the spring being urged against the wall 33. The coil spring supports therebetween the volume displacing pin 50 as in the embodiment of FIG. 3. In FIG. 10 the piston is shown at its equilibrium position. In addition to the passage 46 in the piston there are also provided the notches 53 which may be formed in the same manner as shown in FIG. 4.

The embodiment of FIGS. 10 and 11 operate basically the same as the structure shown in FIG. 3. Thus, should the mass move to the right in FIG. 10, because the vehicle is making a turn, the piston in turn is forced to the right with any fluid to the right of the piston moving into the chamber 97 through the passage 46 at a controlled rate which is at least a function of the cross sectional area of the notches 53. At the same time the opposite end of the stabilizer is charged in a method similar to that discussed previously in connection with FIG. 6 of the present application.

Figure 12:
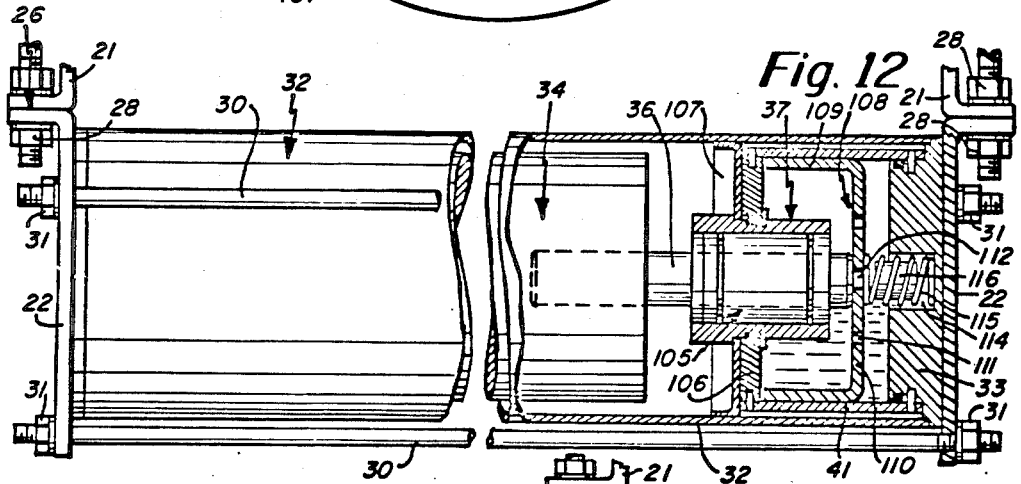
FIG. 12 is a longitudinal cross sectional view illustrating a forth embodiment of the present invention.

FIG. 12 illustrates a fourth embodiment of the present invention. The stabilizer illustrated in FIG. 12 is supported the same as illustrated in FIG. 3 including the brackets 21 and 22. There is also provided a stabilizer housing 32 with support rods 30 extending between the brackets 22 for supporting the stabilizer housing. FIG. 12 illustrates the right end of the stabilizer, it being understood that the left end is substantially identical. In this embodiment the mass 34 has extending from opposite ends the rods 36. The rod 36 depicted in FIG. 12 is supported in a bearing mechanism 37 similar in construction to the mechanism 37 depicted in FIG. 3. The mechanism 37 includes a bearing 105 supported by members 106 and 107. A liquid seal is preferably provided between the bearing 105 and the member 106. The piston 108 depicted in FIG. 12 is cup-shaped having an outer wall 109 adapted to fit into the sleeve or cylinder 41, and an inner wall 110 having a plurality of holes 111 therein. There is also provided a centrally disposed hole 112 which in the position of FIG. 12 is shown covered by the end of rod 36.

In the embodiment of FIG. 12, instead of providing the recess for the spring in the piston, there is provided a slot 114 in the end wall 33 for accommodating the spring 115 and its associated volume displacement pin 116. The other end of the spring 115 is urged against the face of the piston 108.

In the embodiment of FIG. 12, if the mass 34 is moved to the right the rod operates upon the piston 108 to move it against the bias of the spring 115 with fluid being communicated at a gradual rate through the passages 111 from the right side of the piston to the left side of the piston as viewed in FIG. 12. The charging operation as illustrated in the left of FIG. 6 comes about when the piston and the end of the rod 36 are essentially separated causing an increased flow of fluid and in that case in the opposite direction.

Figure 13:
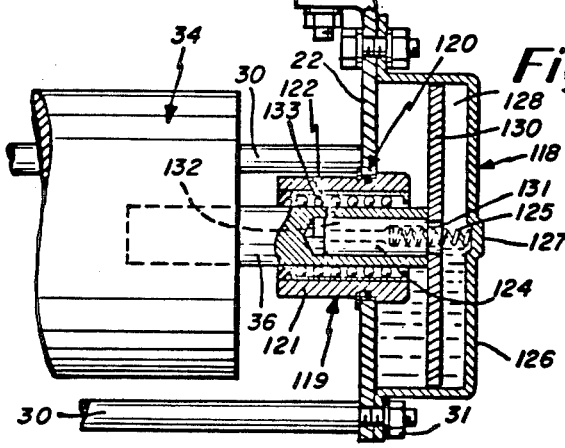
FIG. 13 is a fragmentary cross sectional view showing a portion of the stabilizer for a fifth embodiment in accordance with the invention.

FIG. 13 is a fragmentary cross sectional view of a fifth embodiment of the present invention. In this arrangement, the mass 34 is not contained in any housing, however, end damping means 118 are disposed at each end of the stabilizer and these means along with the mass 34 are interconnected by rods 30 in a similar manner as depicted in FIG. 12. The support for the stabilizer in the embodiment of FIG. 13 may be similar to that of FIG. 12 including the brackets 21 and 22. However, in this embodiment the bracket 22 has an aperture for receiving the bearing member 119. A fluid seal 120 is preferably provided between the bearing support 121 and a hole in the support bracket 22. The bearing support 121 supports a bearing 122 which may be a roller bearing of conventional design. The bearing 122 is for supporting the end support rod 36 extending from the mass 34. The rod 36 has an end passageway for receiving the pin 124. Pin 124 has a centrally disposed passageway with an enlarged diameter section for receiving and seating one end of the spring 125. The other end of the spring 125 sits within housing member 126 at 127. The housing member 126 is secured to the bracket 22 and forms a chamber 128 within which the piston 130 is disposed. The piston 130 has a centrally disposed hole 131 through which the spring 125 also extends. The passageway 132 in the pin 124 also communicates by way of port 133 so that lubrication and fluid may pass by way of the bearing 122.

Thus, if the piston 130 shown in FIG. 13 moves to the right under action of the mass 34, the spring 125 compresses and fluid moves from the right of the piston 130 through the passageway 132 and the port 30 to the bearing and also to the left side of the piston 130. This occurs at a gradual controlled rate which is a function of the size of the various passages and ports through which the fluid passes. In the charging mode of operation wherein the mass 34 shown in FIG. 13 would be considered as moving to the left, then the rod 36 disengages from the piston 130 and additional fluid communication can occur between the rod 36 and the piston 130.

Figure 14:
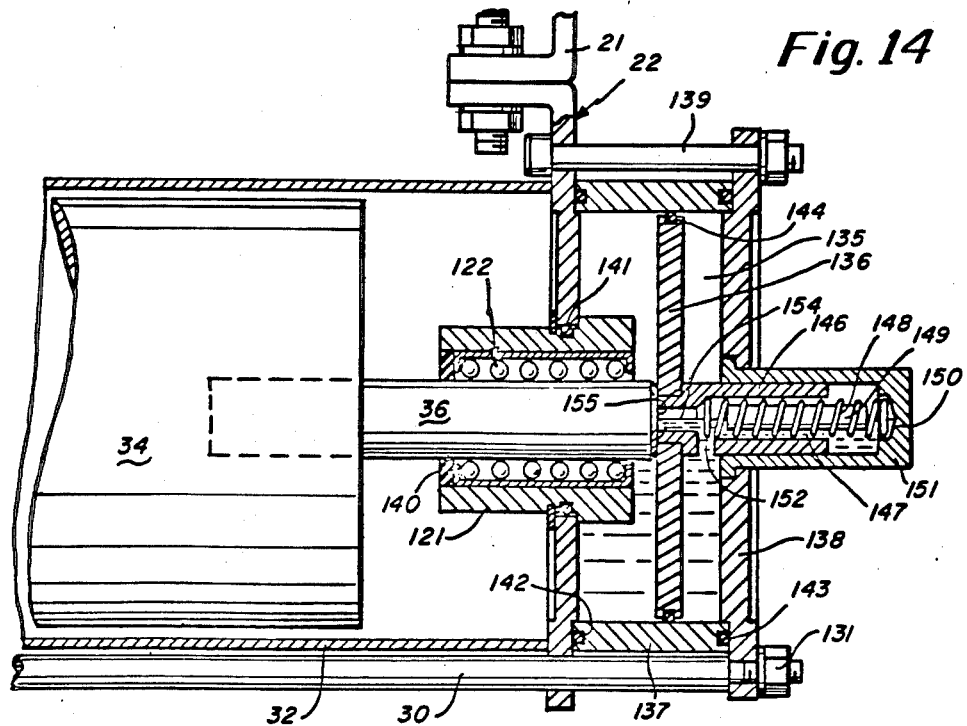
FIG. 14 is a fragmentary cross sectional view showing a sixth embodiment of the present invention.

FIG. 14 shows a sixth embodiment of the present invention illustrated herein. Again, FIG. 14 illustrates the use of support brackets 21 and 22. The construction shown in FIG. 14 is similar to that shown in FIG. 13 including the bearing support 121 and conventional roller bearing 122. In this embodiment the mass 34 with its end rod 36 is supported within a housing 32 with the use of securing rods 30 and associated nuts 31. In this embodiment there is an end chamber 135 in which is disposed the piston 136. The chamber 135 is defined by, in addition to the bracket 22, cylinder 137 and end wall 138. FIG. 14 shows also the use of additional bolts 139 for securing the chamber 135.

In FIG. 14 there are a number of liquid seals that are employed such as the seal 140 associated with the bearing support 121, the seal 141 between the bracket 22 and the bearing support 121, and O-ring seals 142 and 143 associated with the cylinder 137. It is also noted that the piston 136 is provided with an outer O-ring 144.

The piston 136 supports an axially extending member 146 having a centrally disposed passage 147 for receiving the spring 148 and its associated volume displacing pin 149. The passage 147 is stepped to provide a shoulder for receiving one end of the spring 148. The other end of the spring 148 sits within a recess 150 in the support member 151. The member 151 functions as a cylinder and the member 146 as a piston in that cylinder for sliding movement therein. The member 146 also has a side communicating port 152.

In the embodiment of FIG. 14, when the mass 34 is moved to the right there occurs a compression of the fluid in the chamber 135. The rod 36 blocks the passage 154 and thus substantially no fluid bleeds from the right side of the piston to the left side thereof. Because the end face 155 of the rod 36 is not polished there will be some bleeding to the left side but not an appreciable amount. This provides for a relatively gradual movement of the piston to the right. In the charging phase wherein the mass 34 may be considered as moving to the left, or considering the other end of the stabilizer, then there is disengagement between the rod 36 and the piston 136 and under operation of the spring 148, there is a recharging of the chamber 135 with the fluid.

Figure 15:
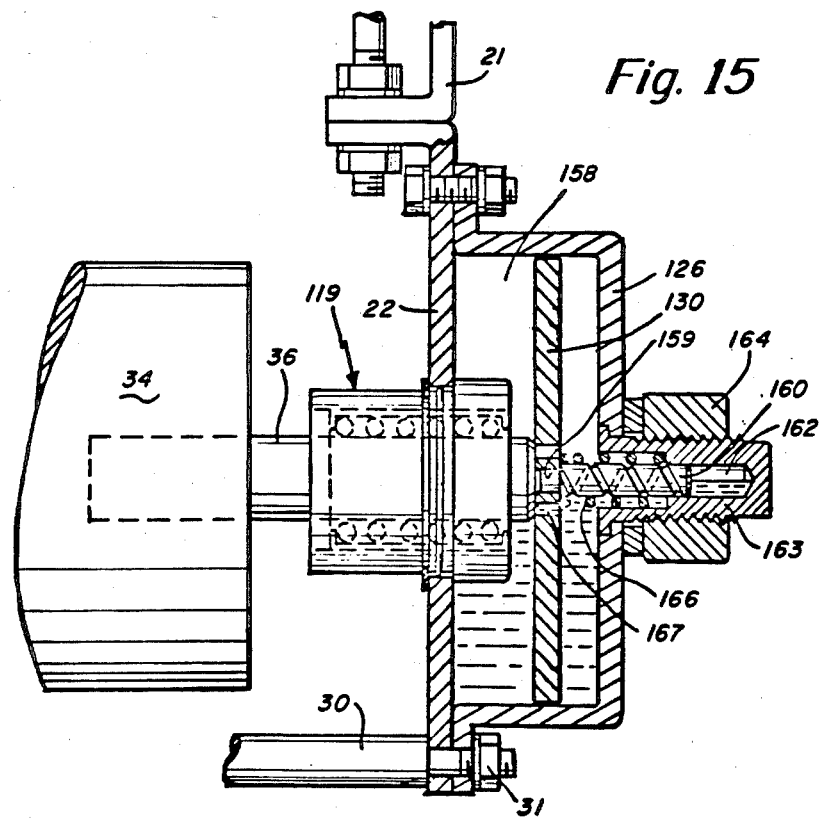
FIG. 15 is another fragmentary cross sectional view showing a seventh embodiment of the present invention similar to the embodiment of FIG. 14.

FIG. 15 is a seventh embodiment of the present invention illustrated herein. This embodiment in a sense combines features of FIGS. 13 and 14. Thus, in FIG. 15 there is shown the usual support bracket 21 and 22 with the associated support rod 30 in combination with mass 34 and its extending support rod 36. The rod 36 extends through the bearing member 119. Member 119 may be substantially identical to the bearing member 119 shown in FIG. 13 or the overall bearing construction illustrated in FIG. 14. FIG. 15 also shows the housing 126 suitably secured from the wall of the bracket 22. The housing 126 defines a compartment 158 within which is disposed the piston 130. The piston 130 has a centrally disposed aperture 159 receiving one end of the hollow spiral shaped support member 160. The member 160 at its opposite end is adapted to fit within a passage 162 in the member 163. The member 163 is suitably supported from the housing 126 by means of a securing nut 164. A spring 166 extends about the spiral shaped member 160 and rests at opposite ends on a shoulder in the member 163 and against the piston 130. The piston also has additional holes 167 for enabling fluid communication between opposite sides of piston.

The embodiment shown in FIG. 15 operates similar to that shown in FIG. 14. When the mass 34 moves to the right the piston 130 is likewise moved in the same direction against the bias of the spring 166. The member 160 slides into the passage 162 during this action. A slight amount of bleeding may occur by way of the passages 167 from the right side of the piston to the left side thereof. During a charging action the rod 36 disengages from the piston 130 and more substantial fluid communication occurs in this case from the left side of the piston to the right side to move the piston back towards its equilibrium position under the force imposed by the spring 166.

FIGS. 16-18 show a eighth embodiment of the present invention wherein the primary support for the mass 34 is directly from the mass and not the end support rods 36. This embodiment also employs support rods 30 having associated therewith end securing nuts 31. FIG. 16 illustrates a top rod 30 which supports blocks 170. The bottom rod 30 supports a U-shaped member 171. FIG. 17 shows the side view of these members. A threaded pin 172 is used to secure the blocks 170 to the mass 34 with the blocks 170 capturing the rod 30. Similarly, the bottom member 171 is secured by a threaded bolt 173 to the mass 34. The U-shaped member 171 maintains the proper positioning with regard to the mass 34 and its associated rod 30. Thus, the movement left and right in FIG. 16 of the mass 34 is under the guidance of the support blocks 170 and the guide member 171. In the embodiment of FIG. 16, the mass 34 has no end rods extending therefrom. Instead, there is provided a piston 174 having associated therewith an actuating plug 175. The piston 174 is disposed within a chamber 176 defined at least in part by walls 177 and 178 and cylinder 179. A sealing O-ring 180 is provided between the actuating plug 175 and the wall 177. A stabilizing spring 181 is disposed between the piston 174 and the wall 177. A second spring 182 is disposed between member 183 in the passage therein, and the otherside of the piston 174. The piston 174 has at its center a elongated slot 185 also depicted in FIG. 18. The spring 182 surrounds a pin 186 which also extends into a passage 187 in the actuating plug 175. One end of the spring 182 rests in the passage in member 183 while the other end rests against a face of the piston 174.

In the embodiment of FIG. 16 the springs 181 and 182 tend to maintain the piston 174 in an equilibrium position as depicted in FIG. 16. If the mass 34 moves to the right, it contacts the actuating plug 175 to in turn move the piston 174 also to the right against the compression of spring 182. Some fluid bleeding may occur through the central slot 185 in the piston 174. In addition, other porting means may be provided in the actuating plug 175 to provide a small controlled amount of fluid bleed from the right side of the piston to the left side thereof.

In the charging action wherein the mass 34 may be considered as moving to the left, then the previously compressed spring 182 urges the piston 174 to the left in FIG. 16. Ring 175A is used to limit the travel of plug 175A and piston 174. The spring 181 separates the plug 175 from the piston 174 to relieve suction in the chamber for quick recharging.

FIG. 19 shows an alternate embodiment of the invention, the ninth embodiment described herein. This embodiment is similar to the one shown in FIGS. 16-18. Only a fragmentary view is depicted in FIG. 19 it being understood that the remainder of the construction may be similar to that found in FIG. 16 with an identical piston arrangement shown at the opposite end of the stabilizer. In the embodiment of FIG. 19 the piston is shown in its charging phase of operation wherein fluid from the chamber is passing as indicated by the arrows 192 from the chamber 190 into the chamber 191. The spring 182 is causing gradual movement of the piston 174 to the left in FIG. 19. It is noted that the weight 34 has moved to the left so that there is a gap between the actuating button 175 and the mass 34. This permits the piston and its associated action button 175 to freely move to the left. Associated with the piston 174 are two or more one-way valves 194 each comprising a plunger 195. This plunger is shown in its open position because fluid flow is being forced from left to right. This is the open position of the valve. When the piston is being pushed in the opposite direction then the plunger 195 is closed.

Figure 20:
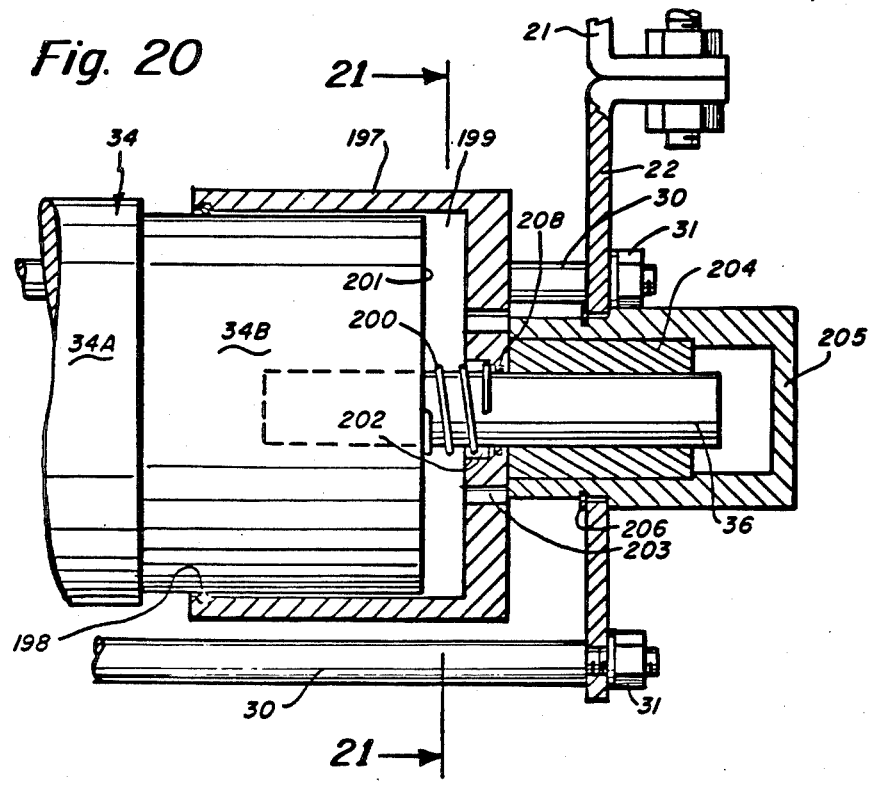
FIG. 20 is a fragmentary cross sectional elevation view of a tenth embodiment of the present invention as illustrated herein.
Figure 21:
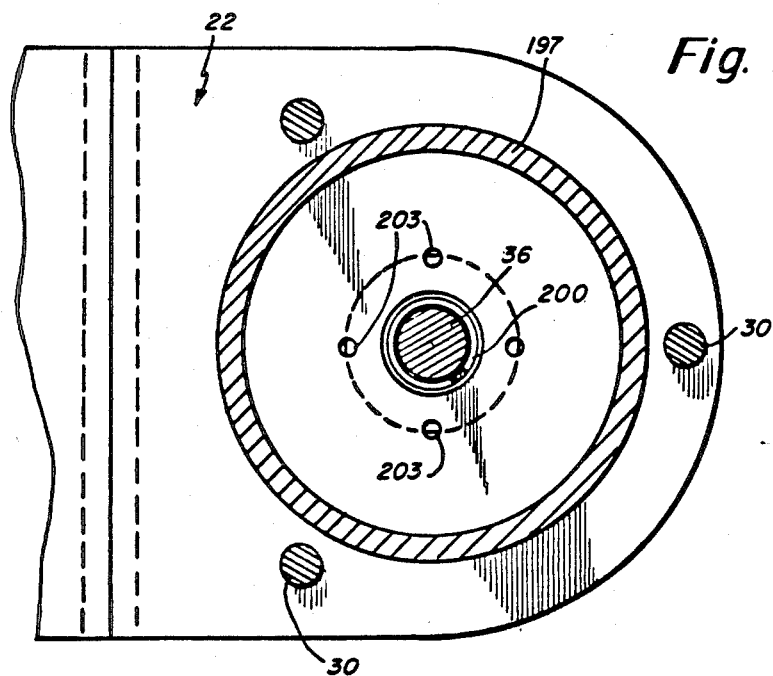
FIG. 21 is a cross sectional view taken along line 21—21 of FIG. 20.

A tenth embodiment of the present invention is illustrated in FIGS. 20 and 21. In this embodiment there is provided a mass 34 having an enlarged section 34A and an end section 34B of slightly smaller diameter. The supporting rod 36 extends from the end 34B. A housing member 197 is provided suitably supported from the bracket 22. In this embodiment typical support rods 30 may be provided along with their associated securing nuts 31. There may preferably be provided a sealing O-ring 198 between the housing 197 and the end 34B of the mass 34. In a sense the end 34B of the mass functions as a piston and provides with the housing 197 a compression chamber 199. The mass is maintained in an equilibrium position by means of the spring 200 which surrounds the rod 36. One end of the spring 200 rests against the face 201 of the end 34B while the other end rests in a shoulder provided in a recess 202 in the housing 197. The housing 197 is also provided with through ports 203 to permit air communication to and from the compression chamber 199. The housing 197 may be a cast iron cylinder with the aforementioned breather holes 203 communicating with the compression chamber 199. The rod 36 is supported in a bearing 204 within the casing 205. The casing 205 is suitably supported with the use of a snap ring 206 in the wall of the bracket 22. The housing 197 is also provided with an O-ring seal 208 disposed about the rod 36. The housing 197 is permitted at least some degree of axial sliding relative to the casing 205.

When the mass 34 moves to the right in FIG. 20, the breather holes 203 are substantially closed against the casing 205 and there is a damping effect by compression in the chamber 199. When the alternate action occurs there is a suction in the compression chamber 199 and the cylindrical housing 197 essentially floats with the mass of the piston end 34B to thus expose the breather holes 203 thus allowing air to relatively rapidly re-enter the compression chamber 199. This is the charging action referred to previously.

Figure 22:
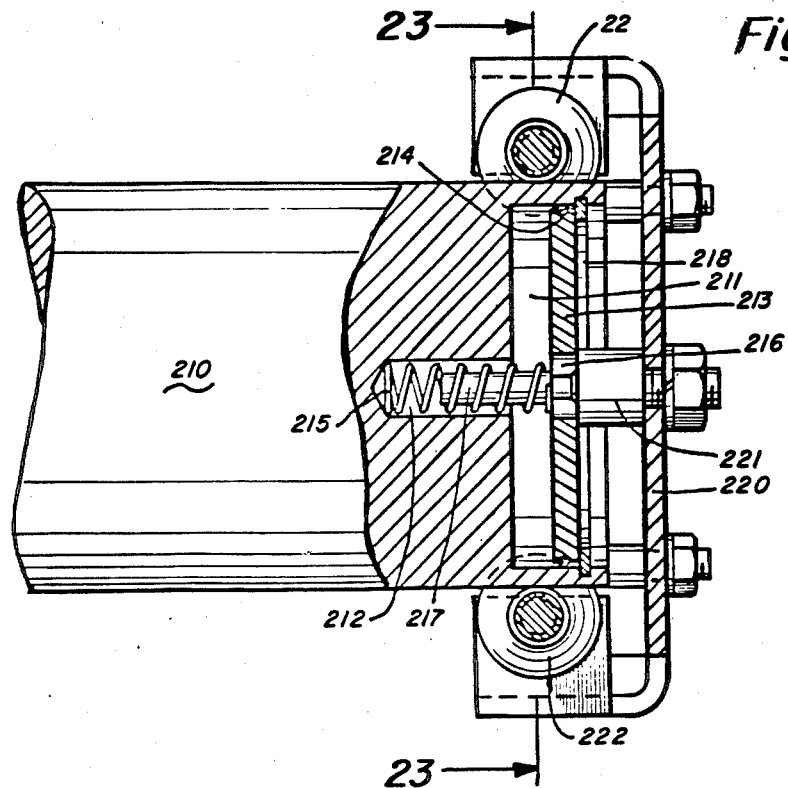
FIG. 22 is a fragmentary cross sectional elevation view of still another eleventh embodiment of the present invention.
Figure 23:
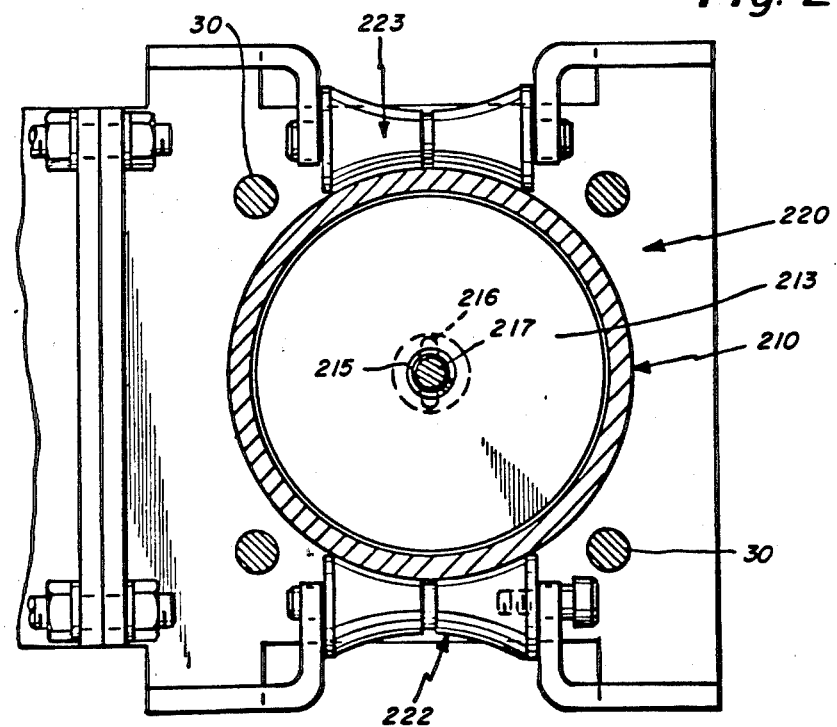
FIG. 23 is a cross sectional view of this embodiment as taken along line 23—23 of FIG. 22.

FIGS. 22 and 23 depict another embodiment of the present invention that is quite simplified in form and employs a slightly different bracket arrangement for supporting the stabilizer from the vehicle. FIGS. 22 and 23 show the structure at only one end of the weight 10, it being understood that a substantially identical structure is used at the opposite end. In this eleventh embodiment of the invention the weight or mass 210 has an end recess 211 defining a compression chamber and communicating to a centrally disposed slot 212 in which the spring 215 is disposed. Within the chamber 211 is disposed the disc piston 213. At its periphery the piston has a sealing O-ring 214. At the center of the disc piston 213 there is provided an elongated slot 216 forming breather holes in the disc 213. Also at the center is supported from the piston disc, a tail piece 217. The spring 215 surrounds the tail piece 217 and rests at its other end against the face of the piston 213. In FIG. 22 the piston 213 is shown at its equilibrium position resting against a supporting snap ring or retaining ring 218. Between the piston 213 and the support bracket 220 there is provided a bumper 221. The snap ring 218 prevent disassembly of the piston from the end of the mass 210. The tail piece 217 associated with the piston in association with the spring 215 forms a guide to stabilize the piston disc in the cylinder portion of the mass.

The mass 210 is supported for axial movement by means of a pair of bottom rollers 222 and a pair of top rollers 223.

With the stabilizer in the position indicated in FIG. 22, with the piston against the bumper 221, there is a restriction against any appreciable air being discharged. Thus, if the mass 210 moves to the right there is a compression in the chamber 211 and an attendant damping action. With regard to the opposite operation wherein the mass may move to the left in FIG. 22, there is a suction in the chamber 211 which prevents any rapid recharge until the mass 210 moves away from the bumper 221 so that the passage 216 is no longer restricted and refilling of the chamber 211 occurs.

Figure 24:
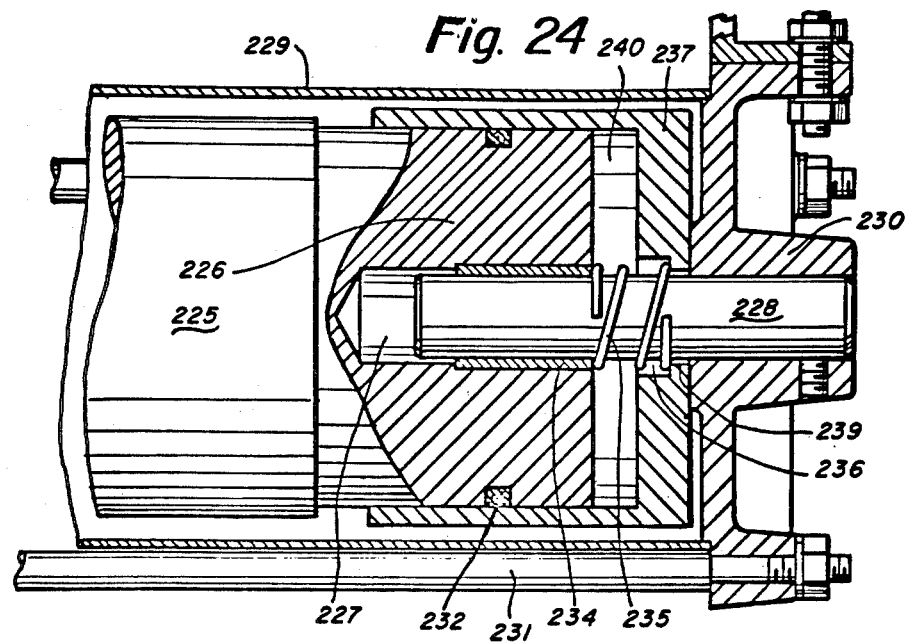
FIG. 24 is a fragmentary cross sectional view of a twelfth embodiment of the present invention illustrated herein.

FIG. 24 illustrates a twelfth embodiment of the present invention including a mass 225 having a reduced diameter end 226 with a passage 227 for receiving the dowel 228. The device also includes a housing 229 and an end member 230. Supporting tie rods 231 are also employed in this arrangement. A lubricating wick 232 is disposed in an annular recess in the end 226. The passage 227 in the end 226 also supports a bushing 234 which may be a teflon lined bushing. About the dowel 228 is a compression spring 235. One end of the compression spring rests against the bushing 234 while the other end fits within a recess 236 in the cylinder 237. The cylinder 237 is also provided with a relatively small breather clearance 239. The compression chamber 240 is defined between the cylinder 237 and weight end 226. In FIG. 24 the stabilizer is shown in its equilibrium position. If the mass 225 moves to the right in FIG. 24, then there is a compression developed in the compression chamber 240. The passages 236 and 239 are essentially blocked by virtue of contact of the cylinder 237 with the end member 230. During recharging when the weight 225 is considered to move to the left, there is sufficient suction in the chamber 240 to permit the cylinder 237 to move slightly to the left until the passages 236 and 239 are then free and then a more rapid recharging of the compression chamber occurs.

Figure 25:
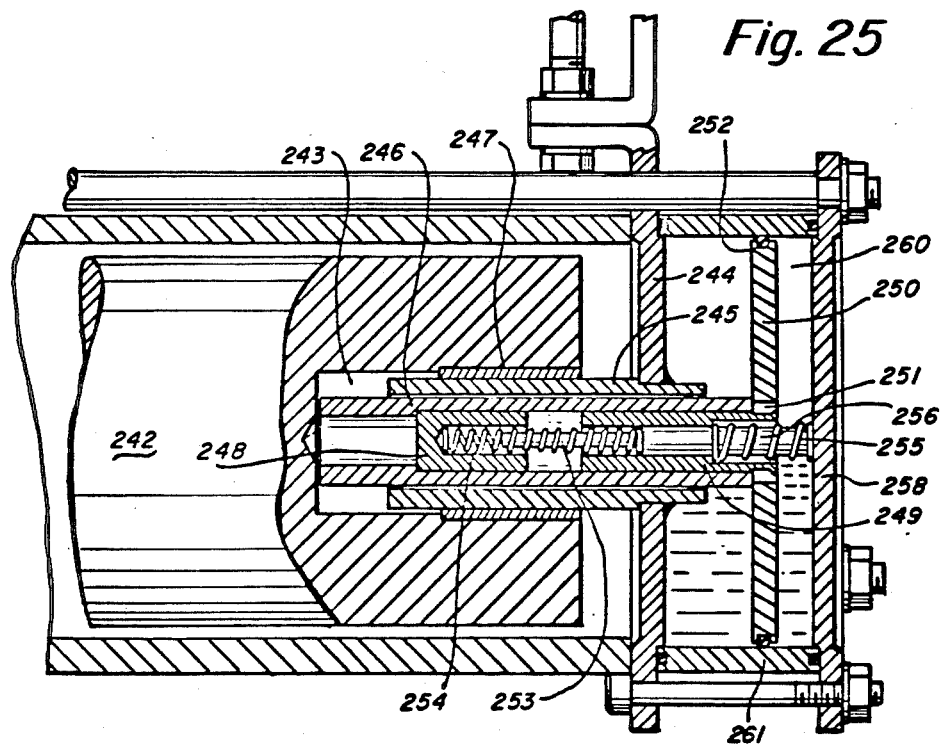
FIG. 25 is a fragmentary cross sectional elevation view of a thirteenth embodiment of the present invention as illustrated herein.

FIG. 25 illustrates a thirteenth embodiment of the present invention including the weight 242 which may have a weight of 25 pounds and has an open passageway 243. A support member 244 is welded along with a cylindrical member 245. Disposed within member 245 is the piston driver 246. A bushing 247 may be provided between the mass 242 and the member 245. Within the piston driver 246 there is disposed a spring socket 248 and a tail piece 249 which is secured to and extends from the piston disc 250. A peripheral O-ring 252 may be associated with the piston 250. The piston also has at its center a breather vent 251 similar to the arrangement depicted in FIG. 18. Extending between the tail piece 249 and the socket 248 is a volume displacement pin 253 about which extends the compression spring 254. Spring 254 is a bias return spring. There is provided a second spring 255 which is a piston return chase spring. The spring 255 surrounds the push pin 256. The pin 256 pushes or presses against the end plate 258. The compression chamber 260 is also defined at least in part by the cylinder 261.

In operation, when the mass 242 moved to the right in FIG. 25 the piston driver 246 is operated against the disc piston 250 at the same time blocking the breather ports 251 and causing compression in the compression chamber 260. The push pin 256 forms an extension between the spring 254 and the spring socket 248 for moving the weight back to a central position. Spring 255 moves the piston against the piston driver. For the recharging action, when the weight 242 is moved to the left there is a suction in the chamber 260 which is quickly relieved by movement of the piston driver away from the vent breathers 251 which results in the piston chasing the piston driver due to rapid refilling of the compression chamber.

Figure 26:
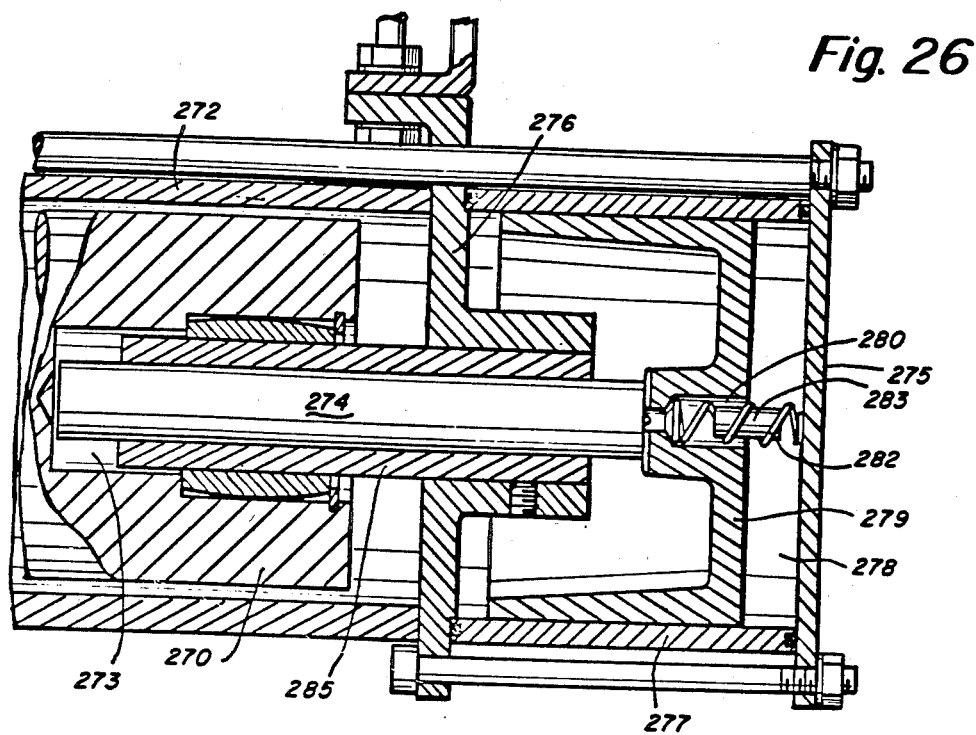
FIG. 26 is a fragmentary cross sectional elevation view of a forteenth embodiment of the present invention as illustrated herein.

FIG. 26 shows another embodiment of the present invention employing mass 270 within a housing 272. The mass 270 has an opening 273 for receiving a piston driver 274. There is provided an end plate 275 and an intermediate member 276 which together with the cylinder 277 define a compression chamber 278 in which is disposed the piston 279. The piston 279 has a passage 280 for receiving the spring 282. There is also provided a volume displacer 283 inside of the spring. One end of the spring rests against the end plate 275. The piston driver 274 operates within a bearing 285. In the embodiment described in FIG. 26, when the mass 270 moves to the right, the piston 279 is driven by the piston driver 274 with the passage 280 blocked by the piston driver so that compression occurs in the compression chamber 278. When the weight 270 moves to the left recharging occurs. The piston driver 274 moves with the weight due to suction forces and the passage 280 is then unblocked, permitting air flow into the compression chamber 278 for recharging.

Having described a limited number of embodiments of the present invention, it should now be apparent to those skilled in the art that numerous other embodiments are contemplated as falling within the scope of this invention. The auto stabilizer has been described in connection with mounting to a motor vehicle such as a conventional automobile or truck. However, it is to be understood that this stabilizer may also be used with other vehicles such as an aircraft or even a boat. Moreover, the stabilizer could be used in connection with boat hauling wherein the stabilizer could be temporarily clamped to the rear of the boat while it is hauled on a trailer. This would substantially increase the stability of the trailer.

What is claimed is:

1. A vehicle stabilizer comprising:
   a frame means adapted to be secured to the vehicle,
   a relatively weighty mass disposed in the frame means, said mass having outwardly extending end portions disposed thereon,
   means for supporting said mass for axial bidirectional translation in said frame means between opposite ends of the frame means, said frame means having means defining a compression chamber at each end of the frame means,
   a pair of pistons, one associated with each compression chamber, each piston having at least one aperture extending therethrough,
   said means for supporting said mass comprising separate means, one at each end of the frame means, for supporting said end portions and defining with said end portions said oppositely disposed compression chambers, each chamber adapted to close as the end portion moves into contact with the aperture of said piston so as to provide substantial resistance to mass translation,
   means supporting each piston for sliding motion in response to mass translation in a first direction and engagement of an end portion with the aperture of said piston, and
   means for biasing each piston in a second direction,
   wherein said piston aperture enables recharging of said compression chamber in response to mass translation in said second direction opposite to said first direction.

2. A vehicle stabilizer as set forth in claim 1 wherein said separate means includes bearing means for supporting respective end portions.

3. A vehicle stabilizer as set forth in claim 1 including a member extending axially from said piston into said compression chamber, said frame means having an extension piece with a recess for receiving the axially extending member.

4. A vehicle stabilizer as set forth in claim 3 wherein said axially extending member has an axial passage communicating with the piston aperture.

5. A vehicle stabilizer as set forth in claim 4 wherein said means for biasing includes a piston return spring disposed about said axially extending member and extending into said extension piece recess.

* * * * *